United States Patent [19]

Hooykaas

[11] Patent Number: 4,509,986
[45] Date of Patent: Apr. 9, 1985

[54] COMPOSITION OBTAINED BY MIXING FLY ASH, OXISLUDGE AND PHOSPHOGYPSUM

[75] Inventor: Carel W. J. Hooykaas, Rotterdam, Netherlands

[73] Assignee: Pelt & Hooykaas B.V., Rotterdam, Netherlands

[21] Appl. No.: 543,430

[22] Filed: Oct. 19, 1983

[30] Foreign Application Priority Data

Oct. 20, 1982 [NL] Netherlands ................... 8204052

[51] Int. Cl.³ ............................................. C04B 11/10
[52] U.S. Cl. ............................ 106/110; 106/DIG. 1
[58] Field of Search ................ 106/109, 110, DIG. 1

[56] References Cited

U.S. PATENT DOCUMENTS 4,108,677 8/1978 Valiga ................................. 106/110
4,398,956 8/1983 Hooykaas ........................... 106/109

Primary Examiner—James Poer
Attorney, Agent, or Firm—Edmund M. Jaskiewicz

[57] ABSTRACT

A composition obtained by mixing fly ash, calciumsulphate hemihydrate and oxisludge, a product caught from gases emanating from converters during steel production.

Oxisludge containing substantial amounts of iron is used in an amount comprised between 0,2 and 10%, preferably 1 to 5%.

The composition is a loose mass or consists of granular products.

9 Claims, No Drawings

COMPOSITION OBTAINED BY MIXING FLY ASH, OXISLUDGE AND PHOSPHOGYPSUM

BACKGROUND OF THE INVENTION

1. Field of the Invention

The present invention relates to a composition obtained by mixing a compound presenting pozzolanic properties, with a moisture containing base composition.

2. Description of the Prior Art

A composition of this type in the form of a granular product obtained by mixing fly ash particles with a tacky solid product resulting from gases emanating from converters during the production of steel and at least comprising a volatile metal or a volatile metal compound, (also called "oxisludge") has been used in the art.

Such a composition is—especially as considered from an industrial point of view—extremely important, as large quantities of fly ash are produced during the combustion of coal, the resulting heat being used on an enlarged scale for driving energy plants; thus preventing the former use of oil products or natural gas. Tacky products, such as solid products resulting from gases emanating from converters during the production of steel and at least containing a volatile metal or a volatile metal compound, may at present be easily processed without the former necessity of employing expensive substances, such as calciumoxide, to convert a tacky product into a non tacky product.

It has been found in practice that a composition containing excellent granular products can be obtained by mixing compositions presenting pozzolanic properties, such as fly ash with a moist gypsum composition obtained in the production of phospheric acid, provided gypsum in the form of a calciumsulphate dihydrate is used.

However, in more recent methods of preparing phosphoric acid, substantial quantities of gypsum in the form of calciumsulphate hemihydrate are produced, which substance inhibits an accurate mixing with fly ash in order to obtain a granular product or a "loose" mass. A granular product or loose mass means a product in which separate free flowing particles are present.

It has now been found that such a granular product or loose mass can, however, be obtained by adding a substance inactivating the inhibitor, inhibiting the production of the desired granular product or said loose mass.

SUMMARY OF THE INVENTION

It is therefor a main object of the present invention to provide a composition obtained by mixing a compound presenting pozzolanic properties and a moisture containing base composition, the composition containing a reaction product of an inhibitor, inhibiting the formation of a loose mass or granules when mixing the base composition and the compound presenting pozzolanic properties, and a compound inactivating this inhibitor.

In case calciumsulphate hemihydrate and fly ash are used, especially the solid product as mentioned hereinbefore at least containing a volatile metal or volatile metal compounds and obtained by catching gases emanated during the production of steel in converters particularly in the form of oxisludge containing a rather greater quantity of iron, appears to act as a compound inactivating the inhibitor.

Is is assumed that the iron as present in the oxisludge reacts with phosphoric acid physically bonded in the hemihydrate. This reaction involves formation of heat and water, both giving rise to an improved formation of granular products.

The quantity of inhibitor inactivating compound in the form of oxisludge, may be used in amounts comprised between 0,2 to 10%; a quantity comprised between 1 to 5%, however, being preferred.

Preferably in a first step the calciumsulphate should be mixed with oxisludge and 30% to 40% of the required total amount of fly ash, whereupon in a second step the obtained granules are mixed with the remaining 60% to 70% of fly ash, without the granules being compressed or desintegrated. Such mixing in a second step, may be accurately performed in a whirl bed mixer. The composition may contain at least 10% of fly ash, preferably more than 15% of fly ash and may contain 20 to 35% of fly ash.

The features of the present invention which are believed to be novel are set forth with particularity in the appended claims.

Other claims and many of the attendant advantages will be more readily appreciated as the same becomes better understood by reference to the following detailed description.

SURVEY OF EXAMPLES

EXAMPLE I

1000 Kg of calciumsulphate dihydrate (as obtained by preparing phosphoric acid according to the wet route) are mixed with 300 kg of fly ash; from the resulting loose mass instanteneously granules are formed.

A mixture of 100 kg. of calciumsulphate hemihydrate (obtained by preparing phosphoric acid according to the wet route) with 300 kg of fly ash does not provide a loose mass nor a good granular product.

The addition of 25 kg. oxisludge (described in EP 81,201,383,7 of 17.12.81) results in a granular product.

EXAMPLE II

1000 Kg of calciumsulphate hemihydrate, as obtained by preparing phosphoric acid according to the wet route, are mixed with 25 kg oxisludge and 90 kg fly ash, resulting in granules which can still be compressed.

Said granules are subsequently mixed with 210 kg of fly ash in a whirl bed mixer without being compressed or desintegrated whereupon the formed granules are recovered.

Although the present invention has been described in connection with some exemplified embodiments thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A composition obtained by mixing a compound presenting pozzolanic properties consisting of fly ash and a moisture-containing base composition consisting of calciumsulfate hemihydrate, the composition containing a reaction product of an inhibitor inhibiting the formation of a loose mass or granules when mixing the base composition and the compound presenting pozzolanic properties, and a compound inactivating this inhibitor consisting of a solid product caught from gases emanating from steel convertors and containing at least a volatile metal or a volatile metal compound.

2. A composition according to claim 1, the compound inactivating the inhibitor being a metal or metal compound.

3. A composition according to claim 1, into which the compound inactivating the inhibitor is added in an amount comprised between 0, 1 and 10%, calculated on the total moisture containing base composition.

4. A composition according to claim 1, said composition at least containing 10% of fly ash.

5. A composition according to claim 1, in which in a first step the base composition has been mixed with a compound inactivating the inhibitor and with a first amount of the compound presenting pozzolanic properties, and in a second step with a second amount of compound presenting pozzolanic properties without substantial compression or desintegration of the particles obtained in the first step.

6. A composition according to claim 3 wherein said amounts range between 1 and 5%.

7. A composition according to claim 4 wherein said composition contains more than 15% of fly ash.

8. A composition according to claim 1 wherein said compound enactivating the inhibitor consists of oxisludge.

9. A composition according to claim 7 containing 25 to 35% of fly ash.

* * * * *